UNITED STATES PATENT OFFICE.

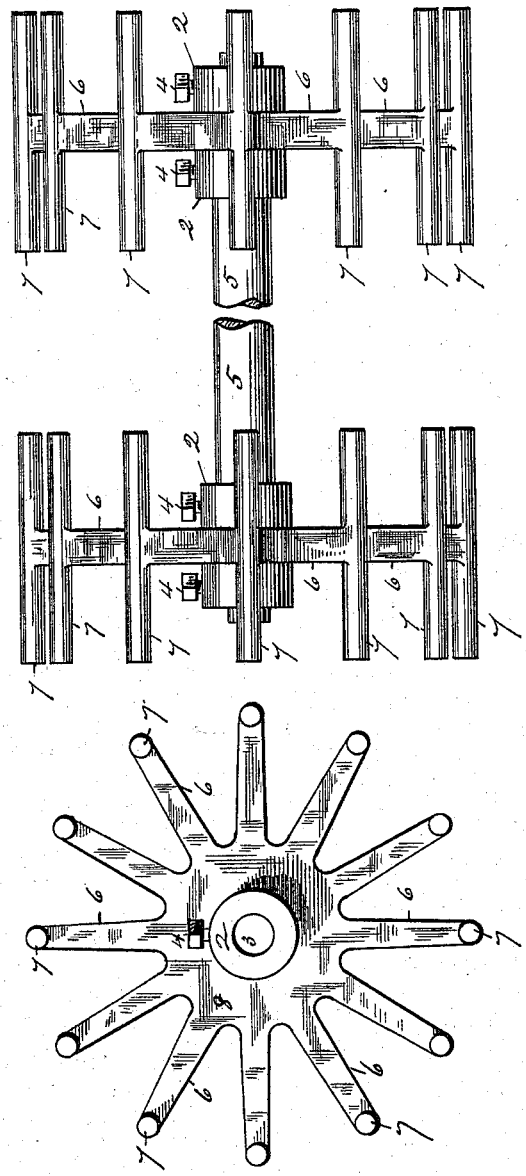

ADELBERT B. CASE, OF SPRINGFIELD, MASSACHUSETTS.

TRACTION-WHEEL.

SPECIFICATION forming part of Letters Patent No. 383,625, dated May 29, 1888.

Application filed December 29, 1887. Serial No. 259,287. (No model.)

*To all whom it may concern:*

Be it known that I, ADELBERT B. CASE, a citizen of the United States, residing at Springfield, in the county of Hampden and State of Massachusetts, have invented new and useful Improvements in Traction - Wheels, of which the following is a specification.

This invention relates to traction-wheels, the object being to provide a traction-wheel of improved construction for use upon lawn-mowers or vehicles, wherein they serve to rotate a shaft and machinery connected therewith through suitable contact with the ground; and the invention consists in the peculiar construction and arrangement of the parts of the wheel, all as hereinafter fully described, and pointed out in the claims.

In the drawings forming part of this specification, Figure 1 is a side elevation, and Fig. 2 is a plan view, of traction-wheels embodying my improvements, Fig. 2 showing a shaft on which two of said wheels are secured.

The essential object of this invention is to provide a traction-wheel in which the tread-bars, which constitute the bearing-surface of the wheel upon the ground, each have an independent bearing free from any surrounding obstruction thereto, whereby the maximum amount of traction - resistance is produced, whether said wheels be used on a traction-engine or whether they be applied to a moving vehicle for the purpose of propelling said machinery thereon. To that end said traction-wheel is constructed as follows:

The within described traction-wheel is made, preferably, of cast metal, iron or brass, and having all the parts thereof integrally united in one piece; and said wheel consists of a hub, 2, of the usual cylindrical form, having a longitudinal circular passage, 3, therethrough to receive the end of a shaft, said hub being provided with a set screw or screws, 4, whereby the wheel is secured on the shaft. A series of spokes or arms, 6, radiate from said hub, and at the extremity of each of said spokes is formed a tread-bar, 7, extending laterally from the sides of said spokes and in a line with the axis of said hub. Said tread-bars may be made longer or shorter, according to the nature of the ground over which they are to run, and of such form as may seem most desirable according to the nature of said ground, whether the surface thereof be ordinarily hard or otherwise, and said tread-bars may extend laterally from one or from both sides of the spokes. In order to connect said spokes with the hub 2 of the wheel in a manner which embodies the strongest construction, a web, 8, is interposed between the hub and the inner ends of the spokes 6; but, if preferred, the spokes may, when the wheel is intended for light work, extend separately to the hub and said web construction be omitted.

In Fig. 2 two traction-wheels are shown upon one shaft, 5, in such position as they would ordinarily assume when placed on the driving-shaft of a lawn-mower or some vehicle on which, ordinarily, two traction-wheels are sufficient.

By means of the above-described construction it is seen that the entire weight which rests upon the traction-wheels is communicated successively to the tread-bars 7 on the ends of the spokes or arms 6, and that since the spaces between said tread-bars are unobstructed there is nothing to prevent the entire weight from being borne by the tread-bars, whereby the latter are caused to be so forced into the surface of the ground over which the wheels rotate that the shaft on which they are secured is caused to rotate with considerable force, and the wheel by means of said construction is ordinarily prevented from slipping or sliding on the ground.

What I claim as my invention is—

1. A traction-wheel consisting of a hub and a series of spokes or arms connected to and radiating from said hub, each of which spokes has on its extremity a tread-bar having the thickness of the end of the spoke extending laterally therefrom substantially in a line with the axis of said hub, substantially as set forth.

2. A metallic traction-wheel integrally constructed and consisting of a hub and of a series of spokes radiating therefrom, each of which spokes has on its extremity a tread-bar having the thickness of the end of the spoke extending laterally therefrom substantially in a line with the axis of said hub, substantially as set forth.

ADELBERT B. CASE.

Witnesses:
H. A. CHAPIN,
G. M. CHAMBERLAIN.